(12) United States Patent
Asano (10) Patent No.: US 6,941,113 B2
(45) Date of Patent: Sep. 6, 2005

(54) TRANSCEIVER CAPABLE OF ADAPTIVELY SELECTING A MODULATION METHOD BASED ON THE TRANSMISSION POWER AND CHANNEL CONDITION

(75) Inventor: Masahiro Asano, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 670 days.

(21) Appl. No.: 09/973,736

(22) Filed: Oct. 11, 2001

(65) Prior Publication Data

US 2002/0142732 A1 Oct. 3, 2002

(30) Foreign Application Priority Data

Mar. 28, 2001 (JP) ........................................ 2001-091884

(51) Int. Cl.[7] .......................... H04B 1/38; H04B 17/00; H04B 1/62
(52) U.S. Cl. ...................... 455/73; 455/522; 455/115.1; 455/115.4
(58) Field of Search ............................. 455/73, 75, 76, 455/115.1, 115.4, 522; 370/252, 352, 420–421, 486–487, 489–490, 493; 375/109–113; 11/222

(56) References Cited

U.S. PATENT DOCUMENTS

| | | | | |
|---|---|---|---|---|
| 6,097,703 A | * | 8/2000 | Larsen et al. ................ | 370/254 |
| 6,643,469 B1 | * | 11/2003 | Gfeller et al. .............. | 398/162 |
| 6,650,624 B1 | * | 11/2003 | Quigley et al. ............. | 370/252 |
| 2003/0114127 A1 | * | 6/2003 | Baldwin ................... | 455/245.1 |
| 2004/0151145 A1 | * | 8/2004 | Hammerschmidt ......... | 370/338 |

* cited by examiner

*Primary Examiner*—Binh K. Tieu
(74) *Attorney, Agent, or Firm*—Bacon & Thomas, PLLC

(57) ABSTRACT

A transceiver determines a modulation method to be used in a signal transmission based on an evaluated transmission channel condition and a difference between transmission powers of communicating transceivers. In this way, the transceiver can choose an optimal modulation method even in the communications between transceivers having different transmission powers. The transceiver comprises a transmission channel condition evaluator for evaluating a transmission channel condition based on a signal received from a counterpart transceiver; and a modulation method selector for determining a modulation method to be used in transmitting a signal to the counterpart transceiver based on the evaluated transmission channel condition and a difference between transmission power of the transceiver and that of the counterpart transceiver.

8 Claims, 7 Drawing Sheets

P-P METHOD

FIG.9B

P-MP METHOD

TRANSCEIVER CAPABLE OF ADAPTIVELY SELECTING A MODULATION METHOD BASED ON THE TRANSMISSION POWER AND CHANNEL CONDITION

FIELD OF THE INVENTION

The present invention relates to a transceiver capable of selecting a modulation method, to be used in a signal transmission, based on an evaluation result of transmission channel condition; and, more particularly, to a transceiver capable of adaptively selecting a modulation method based on a difference between transmission powers of communicating transceivers.

BACKGROUND OF THE INVENTION

In a digital mobile communications system which adopts the TDD (Time Division Duplex) method, a base station transmits a downlink signal to a wireless radio station and the radio station transmits an uplink signal to the base station by alternatively using the entire bandwidth of a transceiver (transmitter-receiver) for a portion of the time corresponding to one of periodically recurring time slots.

Figure 5A:
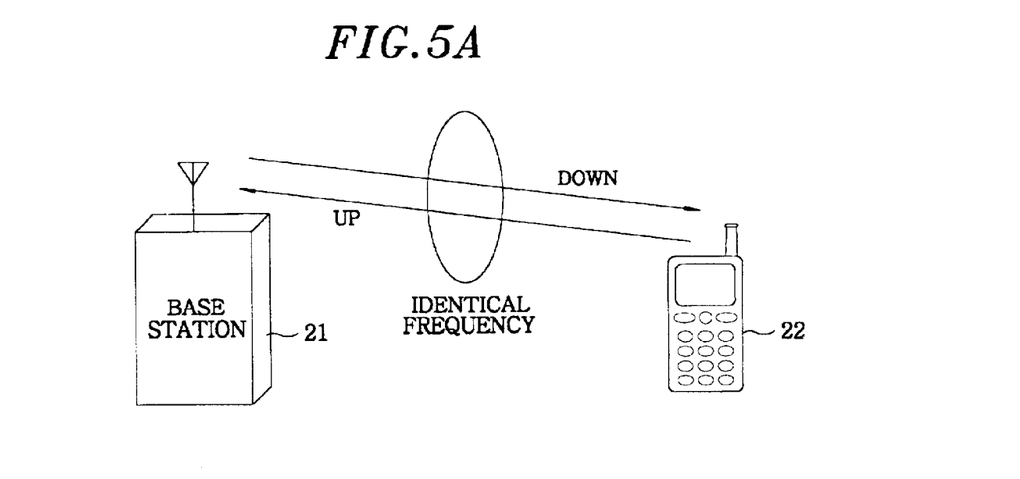
FIGS. 5A and 5B exhibit a typical communications system configuration and communication slots of the TDD (Time Division Duplex) method.

FIG. 5A illustrates an exemplary communications system adopting the TDD method. The communications system includes a base station 21 and a mobile station 22.

Figure 5B:
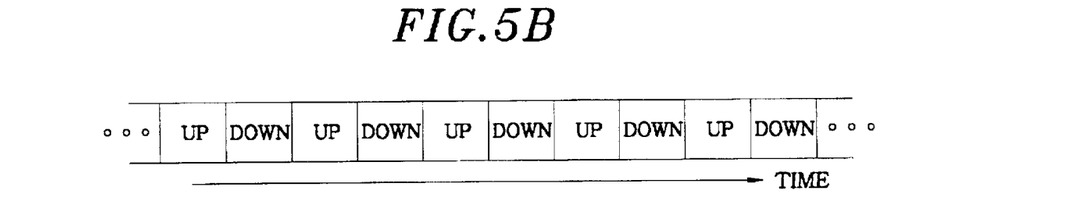

FIG. 5B depicts communication slots used in the TDD method. In FIG. 5B, the horizontal axis represents time and uplink slots and downlink slots are arranged in the communication slots alternatively.

As mentioned above, since the communication is performed in both the uplink and the downlink by using an identical frequency band alternatively, a communication signal from the base station 21 to the mobile station 22 and that from the mobile station 22 to the base station 21 can be treated, according to the principle of reversibility, as passing through transmission channels bearing an identical fading characteristic. Based on the principle of reversibility, a transmission channel condition in a communication slot to be used in sending a signal from a first transceiver to a second transceiver can be estimated by using C/N (Carrier to Noise Ratio) or a delay spread of the transmission channel obtained from a signal transmitted from the second transceiver to the first transceiver during a previous communication slot.

Based on the estimation result of transmission channel condition, an optimal bandpas modulation method is determined so that a transceiver can meet a predetermined error rate and obtain a maximum transmission rate. The determined modulation method is used in transmitting a signal to its counterpart communications transceiver. A modulation method can be converted to another by changing a symbol rate or an M-ary modulation value (modulation level).

If the basic symbol rate is T, it can be changed to T/2, T/4, T/8, and so on. The change of M-ary modulation value can be exemplified by the conversion among, e.g., BPSK(Binary Phase Shift Keying), QPSK(Quadrature Phase Shift Keying), 16QAM(Quadrature Amplitude Modulation), 64QAM, 256QAM, and so on. The M-ary modulation value of BPSK is equivalent to 2, and that of QPSK is equivalent to 4.

When C/N is small or the delay spread is large, the transmission channel condition is considered to be poor so that the symbol rate and the M-ary modulation value can be made small. On the contrary, when C/N is large or the delay spread is small, the transmission channel condition is considered to be good so that the symbol rate and the M-ary modulation value can be made large.

Further, the type and/or the number of the symbol rates and the M-ary modulation values can be varied adaptively according to the type of the communications system being employed.

As described above, the transmission efficiency can be improved by using an adaptive modulation method capable of optimizing a modulation method based on the quality of the communications channel estimated from a received signal.

One of such prior art transceivers for use in a communications system adopting an adaptive modulation method is described by Matsuoka, Uhe, Sambei and Morinaga in "Analysis of transmission characteristics of adaptive modulation method which converts symbol rates and modulation values", *IEICE Technical Report*, RCS94-64, 1994-09.

Figure 6:
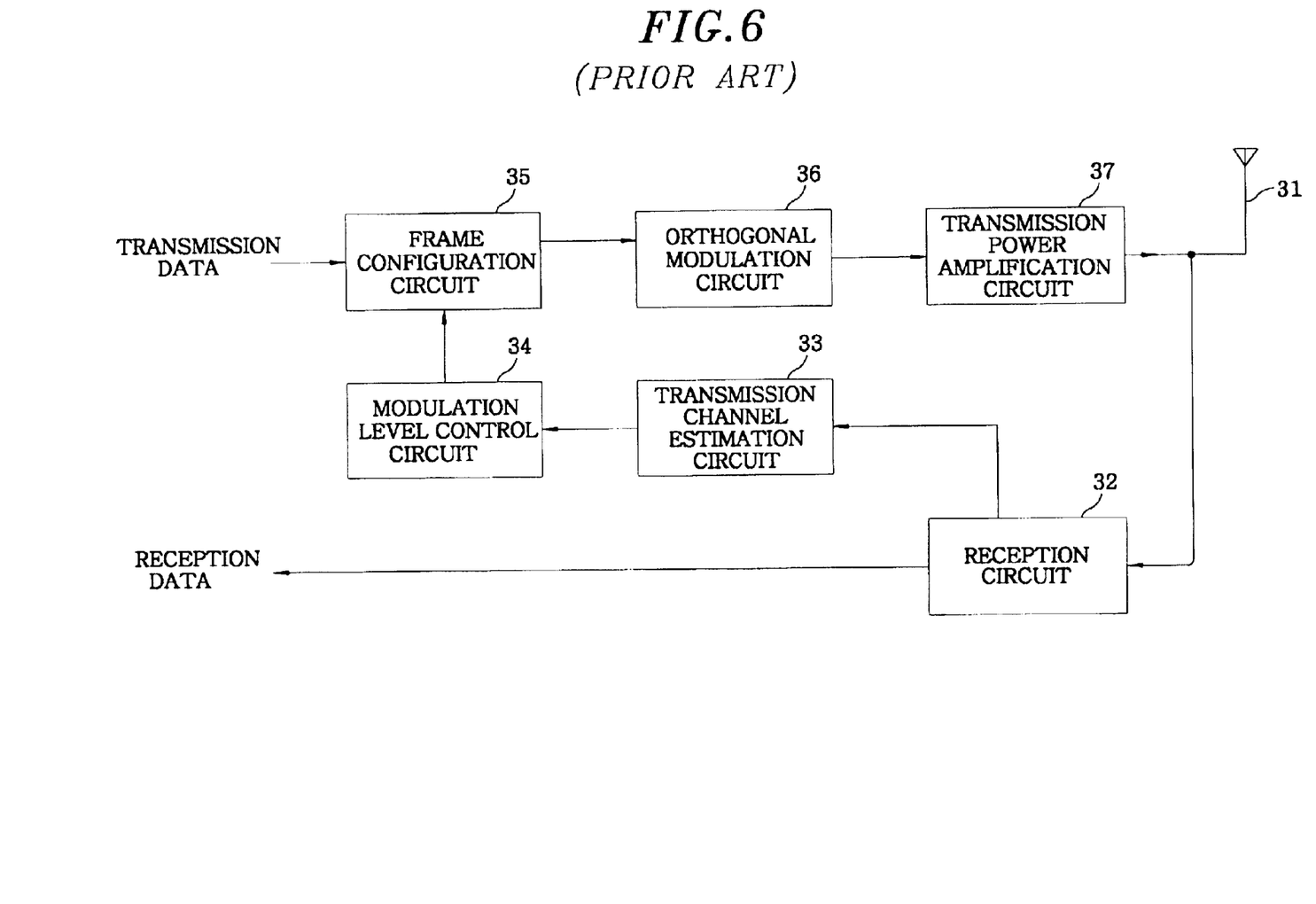
FIG. 6 illustrates a block diagram of a conventional transceiver.

Referring to FIG. 6, there is illustrated a transceiver adopting such an adaptive modulation method described above, which includes an antenna 31, a reception circuit 32, a transmission channel estimation circuit 33, a modulation level control circuit 34, a frame configuration circuit 35, an orthogonal modulation circuit 36 and a transmission power amplification circuit 37.

Figure 7:
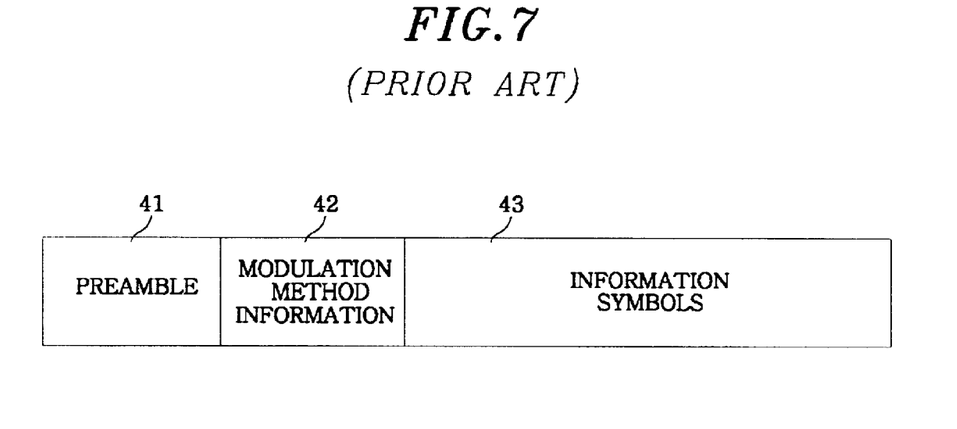
FIG. 7 charts a conventional frame structure.

FIG. 7 shows a frame structure used in the data communication by the transceiver shown in FIG. 6. As shown in FIG. 7, the frame includes a preamble 41 used in estimating a transmission channel condition, modulation method information 42 representing a modulation method used in transmission, and an information symbol 43 carrying the transmission data modulated by using the modulation method indicated by the modulation method information 42.

The transceiver shown in FIG. 6 receives a signal through the antenna 31. And then at the reception circuit 32, orthogonal detection of the received signal is carried out and then the modulation method to be used in modulating the received signal is determined based on the modulation method information 42 and finally the received signal is decoded to obtain received data. The transmission channel estimation circuit 33 detects C/N or the delay spread of the transmission channel and estimates transmission channel condition for a next data transmission. The estimation process at the transmission channel estimation circuit 33 is executed by using reception level information such as reception baseband signal and RSSI (Received Signal Strength Indicator) outputted from the reception circuit 32. Based on the estimation result, the modulation level control circuit 34 controls the modulation value to be used in a next data transmission.

When the transceiver transmits a signal, the frame configuration circuit 35 maps transmission data to symbols of the modulation method corresponding to a modulation value designated by the modulation level control circuit 34 and adds additional information, such as the modulation method information 42 and the preamble 41, to the mapped data, i.e., the information symbols 43, so that the frame shown in FIG. 7 is configured. The orthogonal modulation circuit 36 performs orthogonal modulation of the frame outputted from the frame configuration circuit 35. The modulated signal is amplified by the transmission power amplification circuit 37 and transmitted into the air through the antenna 31.

Figure 8:
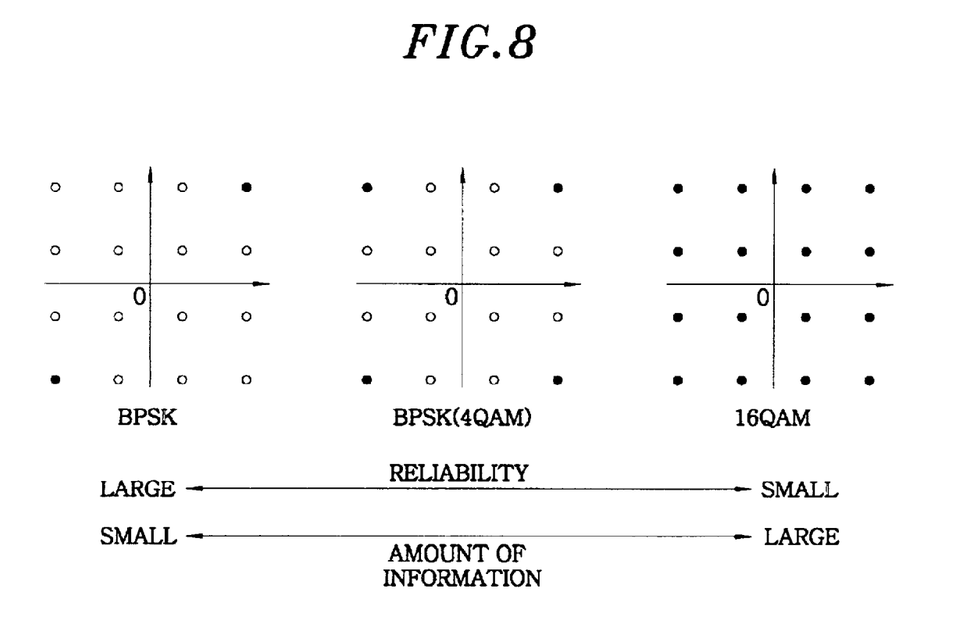
FIG. 8 illustrates characteristics of various modulation methods.

Referring to FIG. 8, characteristics of communication by modulation method will be described.

FIG. 8 shows examples of symbols in case of using BPSK, QPSK(4QAM) and 16QAM, the modulation values thereof being 2, 4 and 16, respectively.

As shown in FIG. 8, the larger the modulation value, the larger the amount of information transmitted and the poorer the reliability of communication. On the contrary, as the modulation value becomes smaller, the amount of information transmitted becomes reduced but with the better communication reliability.

In the adaptive modulation method, a data transmission is performed by using a modulation method of high reliability when the condition of transmission channel is considered to be poor. On the other side, when the condition of transmission channel is considered to be satisfactory, the modulation level control circuit 34 controls the modulation method used in transmission so that a large volume of information can be transmitted. Further, when the condition of the transmission channel is estimated to be worst, dummy data can be transmitted instead of real transmission data.

In this way, the quality of information transmitted, which can be estimated, e.g., by a bit error rate, can be improved.

Another exemplary conventional communications method is described in Japanese Patent Laid-Open Publication No.1998-247955. The digital mobile wireless communications method disclosed therein employs a multi-carrier transmission method utilizing a plurality of sub-carriers, which classifies the transmission channel condition of each sub-carrier into a plurality of levels, chooses a modulation scheme among 64QAM, 16QAM, QPSK and DUMMY by comparing reception condition with a threshold value, and transmits more (less) information through a sub-carrier which has better (worse) transmission channel condition.

Recently, a next generation broadband subscriber wireless access system (FWA system: Fixed Wireless Access system) has been developed and it is under consideration to apply the adaptive modulation method as described above in such an FWA system.

In the FWA system, an antenna of a wireless base station is installed on the rooftop of a building in order to transmit a signal between the wireless base station and a wireless fixed station for a domestic or company subscriber. A frequency bandwidth at, e.g., 26 GHz is used for the FWA system. A maximum transmission rate is 156 Mbit/sec in case of point-to-point (P-P) communication, and 10 Mbit/sec in case of point-to-multipoint (P-MP) communication.

Figure 9A:
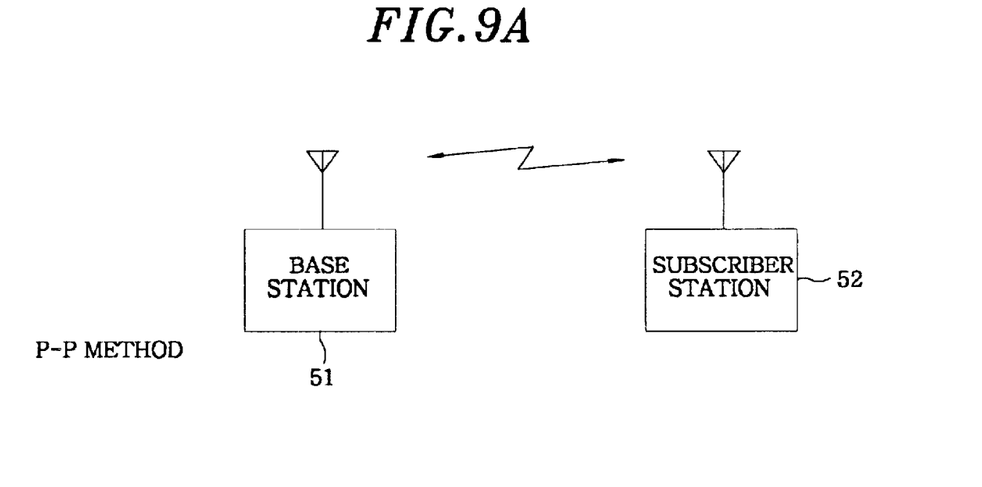
FIGS. 9A and 9B depict examples of FWA (Fixed Wireless Access) systems.

FIG. 9A illustrates an FWA system that adopts a P-P approach. The FWA system shown in FIG. 9A performs wireless communications between one wireless base station 51 and one wireless subscriber station 52.

Figure 9B:
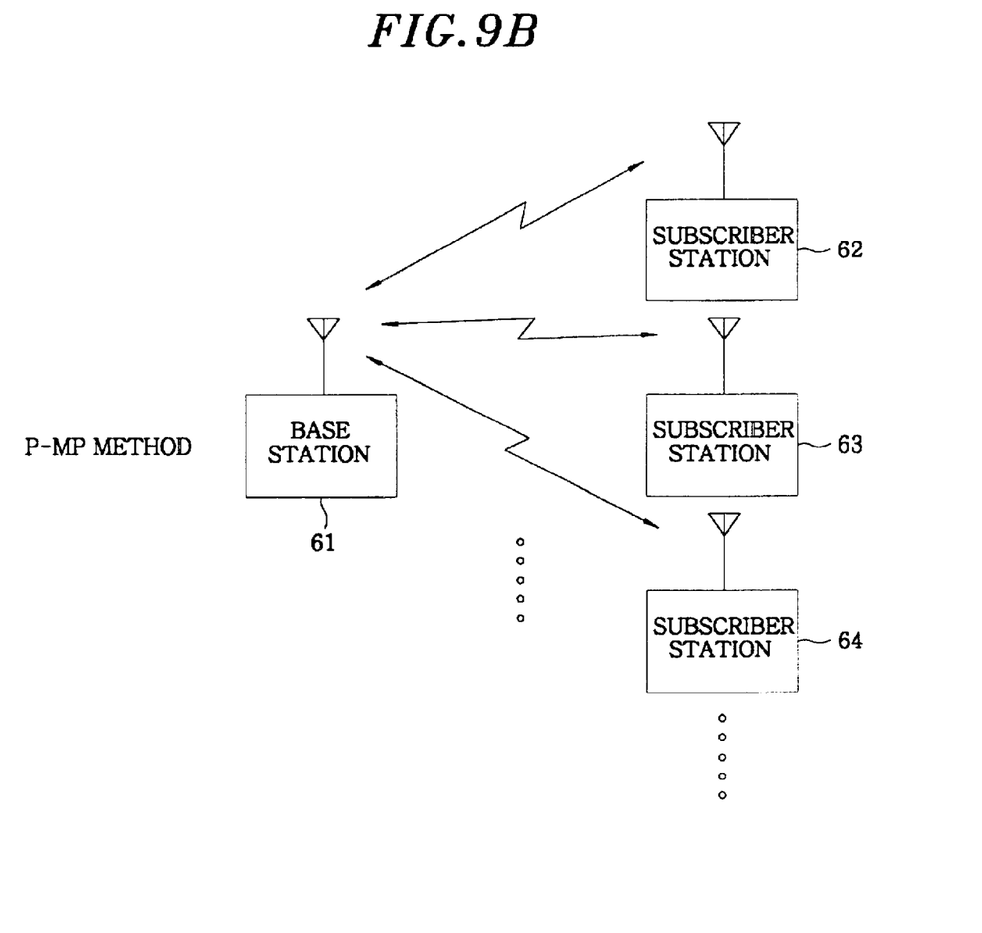

FIG. 9B depicts an FWA system that adopts a P-MP approach. The FWA system shown in FIG. 9B performs wireless communications between one wireless base station 61 and a plurality of wireless subscriber stations 62, 63, 64 and so on.

Each of the wireless subscriber stations 52, 62, 63, 64 can be a fixed station that is fixedly installed in a house or a business building.

For example, an FWA system, the so-called STEP1 system providing an analog telephone service, performs wireless communications between one WLL (Wireless Local Loop) call station (WCS) and WLL subscriber units (WSU) and connects the WCS to WLL access controllers (WACs) through optical fibers.

Another FWA system, the so-called STEP2 system, further provides an ISDN (Integrated Services Digital Network) service or an exclusive line service. The STEP2 system with multi-switching interfaces further includes a wireless entrance station, a wireless subscriber station for being installed in a house, or a WLL repeater station (WRS) between the WCS and the WAC.

As described above, the FWA system, instead of using optical fibers, uses an antenna of a wireless base station installed on the rooftop of a building in order to send a signal from the antenna to a wireless fixed station of a subscriber. In this way, an economic communication service can be provided even in a highly populated building area, a remote island, or a mountainous area in a short span of time.

In the FWA systems, however, communications are carried out by using a preset constant transmission power determined by considering certain unfavorable channel conditions such as rainfall attenuation and so on, which may results in the waste of valuable frequency resources available in fine weather conditions.

Further, the transceiver, which adopts a conventional adaptive modulation method, cannot be employed as it is to a communications system that performs communications by using asymmetric uplink and downlink transmission powers since the transceiver determines a modulation method according to the principle of reversibility in uplink and downlink only without considering the variation of the transmission powers.

SUMMARY OF THE INVENTION

It is, therefore, an object of the present invention to provide a transceiver and an FWA system using a transceiver capable of converting a modulation method to be used in transmission by using an estimation result of a transmission channel condition and a difference between transmission power of the transceiver and that of its counterpart transceiver. In this way, the transceiver can choose an optimal modulation method even in communications between transceivers having different transmission powers.

In accordance with the present invention, there is provided a transceiver comprising: a transmission channel condition evaluator for evaluating a transmission channel condition based on a signal received from a transmitter-receiver; and a modulation method selector for determining a modulation method to be used in transmitting a signal to the transmitter-receiver based on the evaluated transmission channel condition and a difference between transmission power of the transceiver and that of the transmitter-receiver.

Since a modulation method is determined by considering a difference between respective transmission powers of communicating transceivers in accordance with the present invention, an appropriate modulation method can be determined even for the case of communications between transceivers having different transmission powers.

A counterpart transceiver that communicates with a transceiver in accordance with the present invention can be any types of communication devices. For example, if the transceiver in accordance with the present invention is the one installed in a base station, the counterpart transceiver may be the one installed in a mobile station or a fixed station. On the other hand, if the transceiver in accordance with the present invention is the one installed within a mobile station or a fixed station, the counterpart transceiver can be installed in a base station.

Further, the transmission channel condition can be estimated by any measure as long as the communications quality through the transmission channel can be properly evaluated. For instance, the measure of the transmission channel condition can be C/N or a delay spread.

A conversion of the modulation method can be achieved by converting a symbol rate, a modulation value, or both of them. The conversion of the modulation method can be made in any manner if the conversion is performed among a plurality of modulation methods.

The conversion of the modulation method based on the estimation result of the transmission channel condition can be of various types. For instance, a conversion to a modulation method can be made such that the transceiver meets a predetermined error rate and obtains maximum information transmission rate.

Respective transmission powers of the communicating transceivers can be fixed or variable. Therefore, the difference between the transmission powers thereof can also be fixed or variable. The present invention can be applied in both situations mentioned above.

A transceiver in accordance with the present invention preferably converts a modulation method into one of multiple modulation methods such as QPSK, 16QAM and 64QAM. However, the modulation method of the present invention can also be chosen from any other types than the above three modulation methods.

When the transmission channel condition is significantly poor, the transceiver in accordance with the present invention preferably transmits dummy data instead of real transmission data. In this way, the transceiver can preferably transmit data through transmission channels of acceptable quality.

Further, the transceiver in accordance with the present invention preferably receives a signal that includes transmission power information of the counterpart transceiver. And then, an appropriate modulation method is selected based on the transmission power information included in the receiving signal.

In this way, even when the transmission power of the counterpart transceiver is changed by transmission power control, the transceiver can identify the transmission power of the counterpart transceiver based on the received transmission power information. The transmission power information can be of any type as long as it can deliver the transmission power of the counterpart transceiver.

The transceiver in accordance with the present invention can preferably be applied to an FWA system where a wireless base station accommodates and communicates with a plurality of wireless fixed stations.

Specifically, in an FWA system in accordance with the present invention, each of the wireless fixed stations includes the transceiver of the present invention and communicates with the wireless base station by using the transceiver.

The transceiver in accordance with the present invention can be included in the wireless base station, so that the wireless base station communicates with the wireless fixed station by using the transceiver.

The type of the communications between the wireless base station and the wireless fixed station can be P-MP type or P-P type.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

A preferred embodiment of the present invention will now be described in detail with reference to accompanying drawings.

Figure 1:
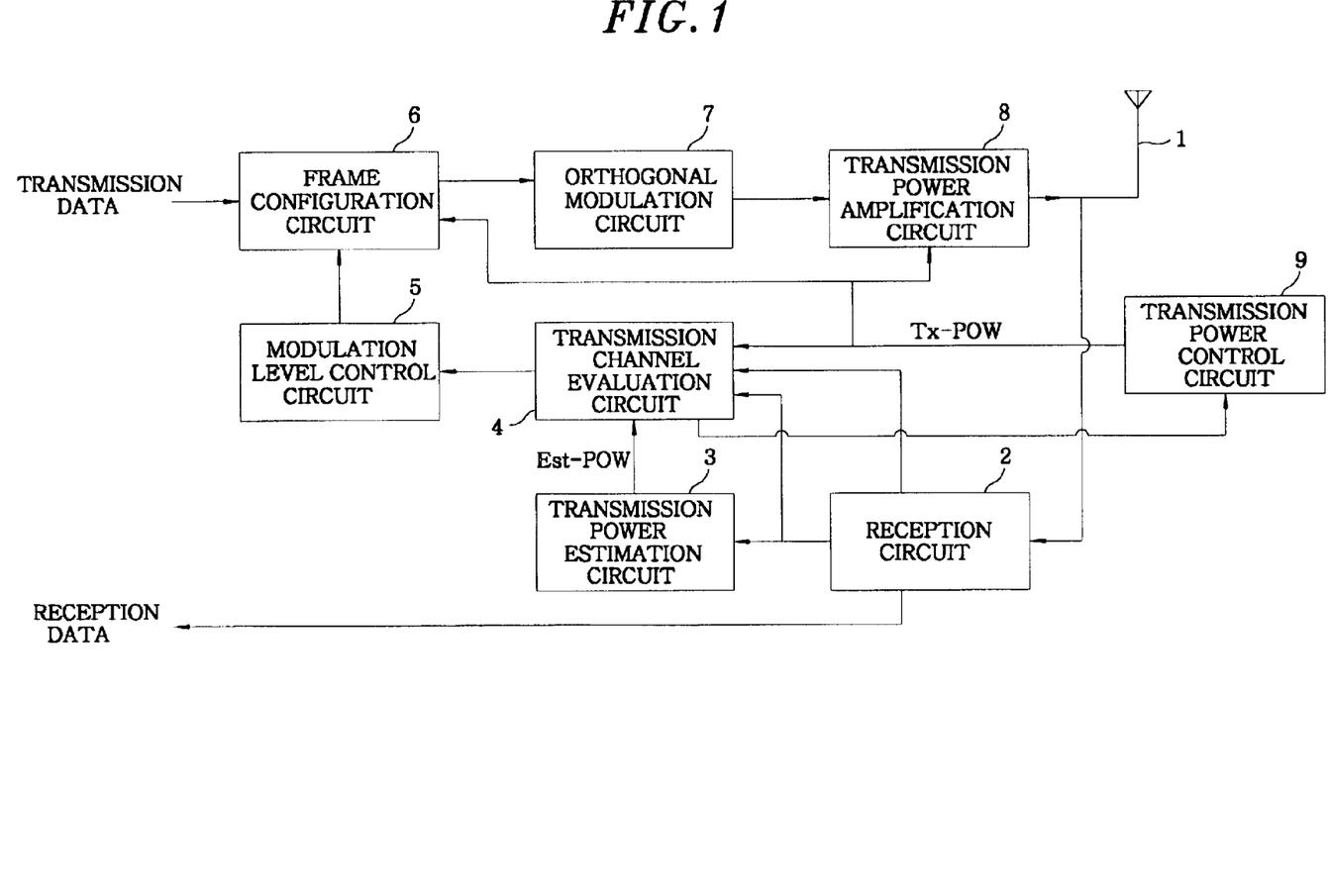
FIG. 1 illustrates a block diagram of a transceiver in accordance with the present invention.

FIG. 1 illustrates a transceiver in accordance with a preferred embodiment of the present invention for adaptively converting a modulation method by considering transmission powers of the communicating system.

As shown in FIG. 1, the transceiver comprises an antenna 1, a reception circuit 2, a transmission power estimation circuit 3, a transmission channel evaluation circuit 4, a modulation level control circuit 5, a frame configuration circuit 6, an orthogonal modulation circuit 7, a transmission power amplification circuit 8 and a transmission power control circuit 9.

Figure 2:
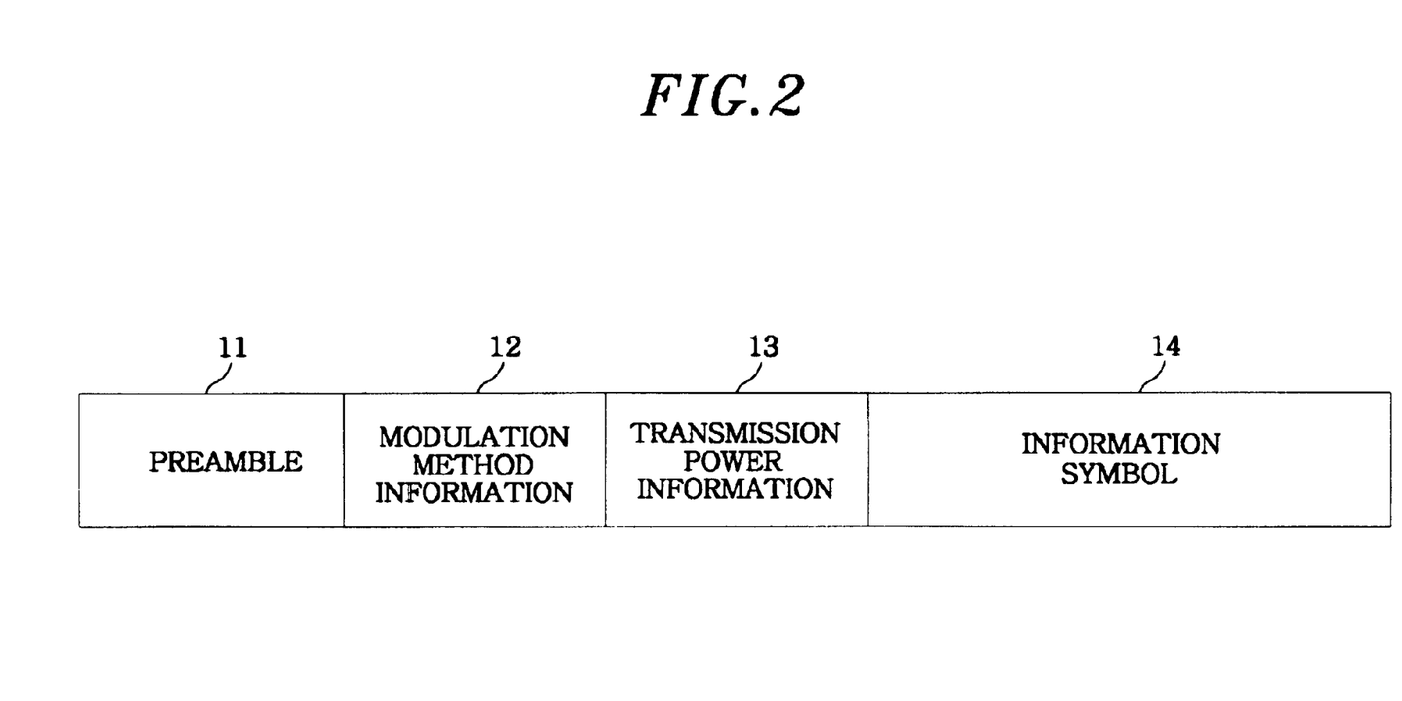
FIG. 2 exhibits a structure of a frame in accordance with the present invention.

FIG. 2 shows a structure of a frame transmitted by the transceiver in accordance with the preferred embodiment of the present invention. The frame includes a preamble 11 to be used in evaluating a transmission channel condition, modulation method information 12 representing a modulation method used in data transmission, transmission power information 13 representing a transmission power, and an information symbol 14 obtained by modulating transmission data by using the modulation method used in the transmission.

In the following, the operation of the transceiver in accordance with the present invention will be described in detail.

The antenna 1 outputs a signal received from a counterpart transceiver to the reception circuit 2, and transmits a signal inputted from the transmission power amplification circuit 8 to the counterpart transceiver. In the preferred embodiment of the present invention, signals of the frame structure shown in FIG. 2 are transmitted and received by the antenna 1.

The reception circuit 2 performs orthogonal detection of the received signal from the antenna 1, determines a modulation method for the received signal based on the modulation method information 12 included in the received signal and decodes the received signal to get reception data by using a demodulation method corresponding to the determined modulation method. Further, the reception circuit 2 outputs a received baseband signal to the transmission power estimation circuit 3 and the transmission channel evaluation circuit 4 and dispatches to the transmission channel evaluation circuit 4 received power information such as RSSI as the reception level information.

The transmission power estimation circuit 3 extracts the transmission power information 13 from the received baseband signal inputted from the reception circuit 2 and estimates transmission power (Est-POW) by using the transmission power information 13 to thereby output the estimated transmission power to the transmission channel evaluation circuit 4.

Based on the estimation result from the transmission channel evaluation circuit 4, the transmission power control circuit 9 sets a transmission power value to meet a transmission channel condition, e.g., when transmission power control is required to reduce interference in a communications system that includes the transceiver in accordance with the present invention. And then, the transmission power control circuit 9 outputs the transmission power value (Tx-POW) to the transmission channel evaluation circuit 4, the frame configuration circuit 6 and the transmission power amplification circuit 8.

The transmission channel evaluation circuit 4 evaluates the transmission channel condition by using, e.g., C/N or a delay spread determined based on the preamble 11 included in the received baseband signal inputted from the reception circuit 2, the received power information inputted from the reception circuit 2, the estimated transmission power (Est-POW) for the received signal inputted from the transmission power estimation circuit 3 and the transmission power value (Tx-POW) for the transmission signal inputted from the transmission power control circuit 9. The evaluated transmission channel condition, e.g., C/N, is outputted to the modulation level control circuit 5.

The modulation level control circuit 5, responsive to the estimation result of the transmission channel condition inputted from the transmission channel evaluation circuit 4, selects a modulation method to be used for the subsequent signal transmission by changing the modulation value and controls the frame configuration circuit 6 such that the selected modulation method is used in the subsequent signal transmission.

The transceiver in accordance with the present invention chooses a modulation method and a power amplification method capable of transmitting data with an error rate lower than a predetermined value at a maximum transmission rate.

The frame configuration circuit 6 maps transmission data to symbols of the modulation method selected by the modulation level control circuit 5. And then, in order to configure a transmission frame as shown in FIG. 2, the frame configuration circuit 6 adds to the mapped data additional information including the modulation method information 12 representing the selected modulation method, the preamble 11 containing a given pattern to be used in evaluating the transmission channel condition and the transmission power information 13 representing the transmission power controlled by the transmission power control circuit 9. The transmission frame is outputted to the orthogonal modulation circuit 7.

Although the additional information 11 to 13 can be simply added to the information symbol 14 in time-divisional manner as shown in FIG. 2, it is also possible to multiplex the information symbol 14 and the additional information 11 to 13 by increasing the number of codes in order to improve the frame efficiency.

The orthogonal modulation circuit 7 performs orthogonal modulation of the transmission frame inputted from the frame configuration circuit 6 and outputs the modulated transmission frame to the transmission power amplification circuit 8.

The transmission power amplification circuit 8, based on the transmission power value inputted from the transmission power control circuit 9, amplifies the transmission frame inputted from the orthogonal modulation circuit 7 and transmits the amplified transmission frame into the air through the antenna 1. The transmission power of the transmission frame emitted from the antenna 1 is controlled by the transmission power amplification circuit 8 to be identical to the transmission power value supplied by the transmission power control circuit 9.

Figures 3A, 3B:
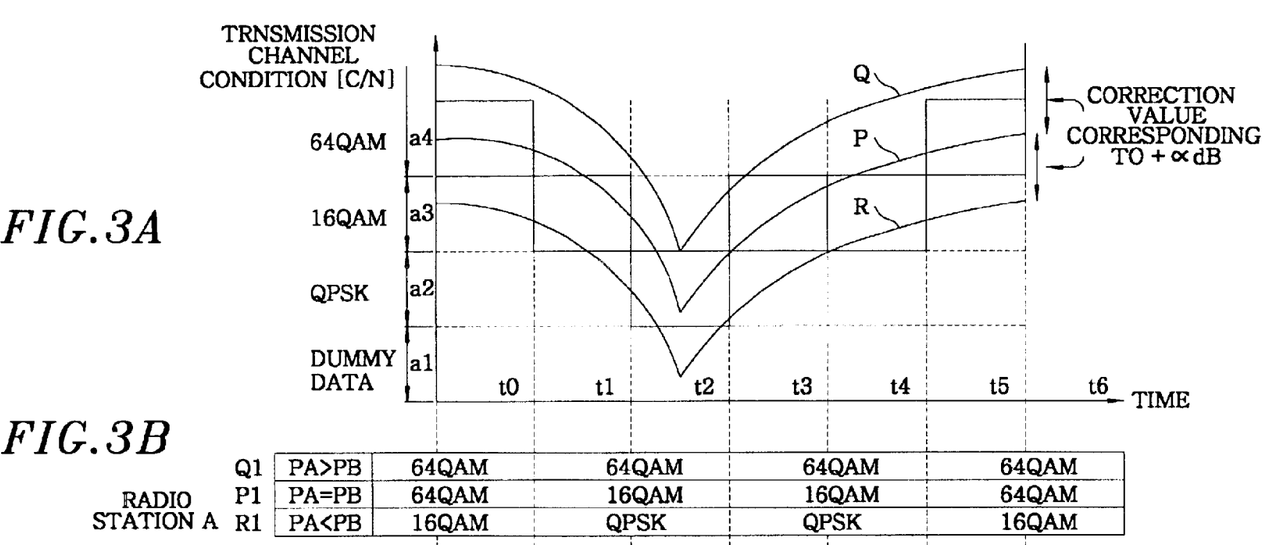
FIGS. 3A to 3D exemplify a modulation method determination scheme in accordance with the present invention.
Figure 3C:
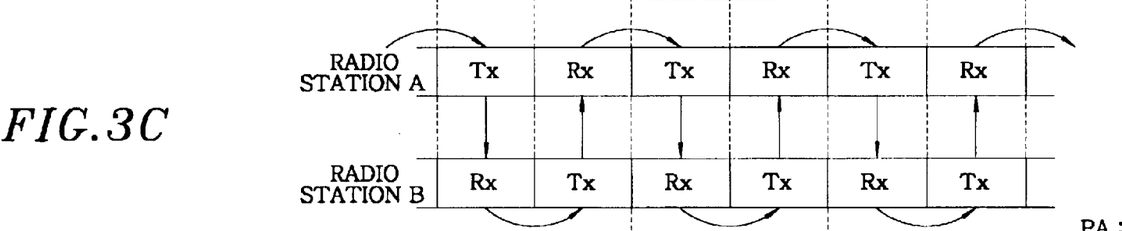
Figure 3D:
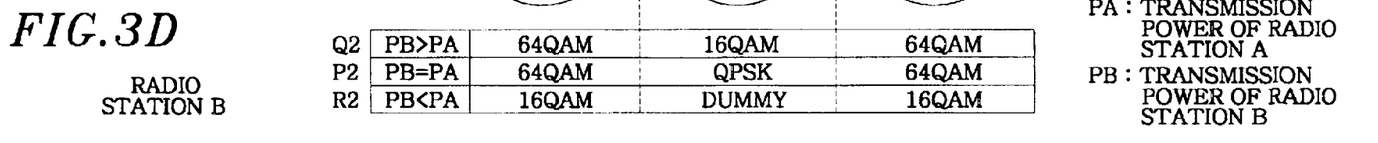

Referring to FIG. 3, an exemplary modulation value control in accordance with the present invention will now be described. FIG. 3 exemplifies an evaluation of the transmission channel condition and the control of the modulation value in case where the wireless communications are carried out between radio stations A and B each of which is equipped with a transceiver of the present invention.

In the preferred embodiment of the invention, the modulation method is selected, by changing an M-ary modulation value, from the group including, but not limited to, a dummy data method that transmits dummy data, QPSK method, 16QAM method and 64QAM method.

In the preferred embodiment, the transmission channel condition is evaluated based on a C/N value only, and the extent of C/N values is divided into 4 ranges $a_1$, $a_2$, $a_3$ and $a_4$, each of which having a preset width and $a_1 < a_2 < a_3 < a_4$.

In the preferred embodiment of the present invention, the dummy data method is selected to stop transmitting data when the C/N value falls within the range $a_1$, indicating the worst transmission channel condition. When the C/N value falls within the ranges $a_2$, $a_3$ and $a_4$, QPSK, 16QAM and 64QAM methods are respectively determined as the modulation method to be used in transmitting data. The orthogonal modulation circuit 7 serves to perform orthogonal modulation such that the transmission data is modulated by the determined modulation method.

FIG. 3A illustrates transmission channel conditions P, Q and R when the transmission power levels correspond to (reference value) [dB], (reference value +α) [dB] and (reference value −α) [dB], respectively. The horizontal and vertical axis of the graph shown in FIG. 3A represents time and the evaluation result of the transmission channel condition (C/N), respectively.

For the sake of explanation, the vertical axis of the graph in FIG. 3(a) is divided into 4 ranges $a_1$, $a_2$, $a_3$ and $a_4$. The horizontal axis of the graph is divided into 7 time slots $t_0$, $t_1$, $t_2$, $t_3$, $t_4$, $t_5$ and $t_6$.

FIG. 3B drawn on the identical time axis as in FIG. 3A, illustrates modulation methods determined by a radio station A when the transmission power (PA) of the radio station A is larger than the transmission power (PB) of the radio station B by the amount corresponding to +α dB of CN (Q1: PA>PB), when PA is equal to PB (P1: PA=PB), and when PA is smaller than PB by the amount corresponding to −α dB of CN (R1: PA<PB), respectively.

FIG. 3C, which is also drawn to the time axis of FIG. 3A, depicts slots used in communications between the radio stations A and B. As shown in FIG. 3C, the radio stations A and B perform transmission (Tx) and reception (Rx) alternatively. In time slots $t_0$, $t_2$ and $t_4$, the radio station A transmits a signal to the radio station B. In time slots $t_1$, $t_3$ and $t_5$, the radio station B transmits a signal to the radio station A.

FIG. 3D, also drawn on the same time scale of FIG. 3A, exhibits modulation methods employed by the radio station B when PB is larger than PA by the amount corresponding to +α dB of C/N (Q2: PB>PA), when PB is equal to PA (P2: PB=PA), and when PB is smaller than PA by the amount corresponding to −α dB of C/N (R2: PB<PA), respectively.

First, when the transmission powers of the radio stations A and B are equal to each other (P1, P2), the radio stations A and B determine the modulation method to be used for the transmission of a next signal by using the transmission channel condition evaluated from the signal transmitted from the counterpart radio stations B and A.

Specifically, if the evaluation result of the transmission channel condition obtained by the radio station A based on a signal received from the radio station B follows the curve P shown in FIG. 3A, the radio station A sets 64QAM as the modulation method for time slot $t_0$ based on the transmission channel condition at the previous time slot of time slot $t_0$; 16QAM, for time slot $t_2$ based on the transmission channel condition at time slot $t_1$; 16QAM, for time slot $t_4$ based on the transmission channel condition at time slot $t_3$; and 64QAM for time slot $t_6$ based on the transmission channel condition at time slot $t_5$.

Similarly, when the evaluation result of the transmission channel condition obtained by the radio station B based on a signal received from the radio station A follows the curve P shown in FIG. 3A, the radio station B sets the modulation method to 64QAM for time slot $t_1$ based on the transmission channel condition at time slot $t_0$; to QPSK for time slot $t_3$ based on the transmission channel condition at time slot $t_2$; and to 64QAM for time slot $t_5$ based on the transmission channel condition at time slot $t_4$.

Secondly, it is assumed that the transmission powers of the radio stations A and B correspond to (reference value +α) [dB] and (reference value) [dB], respectively (Q1, R2) and that the transmission channel conditions evaluated by the radio stations A and B follow the curve P as shown in FIG. 3A.

In this case, since the radio station A transmits a signal under the transmission channel condition offset by +α[dB] from the transmission channel condition evaluated by the radio station A based on a signal received from the radio station B, the radio station A chooses a modulation method for transmission based on the transmission channel condition of curve Q shown in FIG. 3A. That is, since the difference between the transmission powers of the radio stations A and B corresponds to α dB in terms of C/N for the radio station A, the modulation method of the radio station A is determined based on the curve Q obtained by adding to the transmission channel condition of P a correction value +α[dB] corresponding to the transmission power difference.

To put it in detail, the radio station A sets the modulation method to 64QAM for time slot $t_0$ based on the transmission channel condition at a time prior to time slot $t_0$, to 64QAM for time slot $t_2$ based on the transmission channel condition at time slot $t_1$; to 64QAM for time slot $t_4$ based on the transmission channel condition at time slot $t_3$; and to 64QAM for time slot $t_6$ based on the transmission channel condition at time slot $t_5$.

Meanwhile, since the radio station B transmits a signal under the transmission channel condition offset by −α[dB] from the transmission channel condition evaluated at the radio station B based on a signal received from the radio station A, the radio station B chooses a modulation method based on the transmission channel condition of curve R shown in FIG. 3A. That is, since a difference between the transmission power of the radio station A and that of the radio station B corresponds to −α[dB] in terms of C/N for the radio station B, the modulation method of the wireless radio station B is determined based on the curve R obtained by adding to the transmission channel condition of P a correction value −α[dB] corresponding to the transmission power difference.

To put it in detail, the radio station B sets the modulation method to 16QAM for time slot $t_1$ based on the transmission channel condition at time slot $t_0$; to dummy data method for time slot $t_3$ based on the transmission channel condition at time slot $t_2$; and to 16QAM for time slot $t_5$ based on the transmission channel condition at time slot $t_4$.

Finally, if the transmission powers of the radio stations B and A correspond to (reference value +α) [dB] and (reference value) [dB], respectively (R1, Q2) and that the transmission channel conditions evaluated at the radio stations A and B follow the curve P shown in FIG. 3A, the radio stations A and B respectively perform correction to the transmission channel condition P evaluated from a signal received from the counterpart radio stations B and A, in a similar manner as in the previous case.

To put it in detail, the radio station A sets the modulation method to 16QAM for time slot $t_0$ based on the transmission channel condition at a time prior to time slot $t_0$; to QPSK for time slot $t_2$ based on the transmission channel condition at time slot $t_1$; to QPSK for time slot $t_4$ based on the transmission channel condition at time slot $t_3$; and to 16QAM for time slot $t_6$ based on the transmission channel condition at time slot $t_5$.

Further, the radio station B sets the modulation method to 64QAM for time slot $t_1$ based on the transmission channel condition at time slot $t_0$; to 16QAM for time slot $t_3$ based on the transmission channel condition at time slot $t_2$; and to 64QAM for time slot $t_5$ based on the transmission channel condition at time slot $t_4$.

Figure 4:
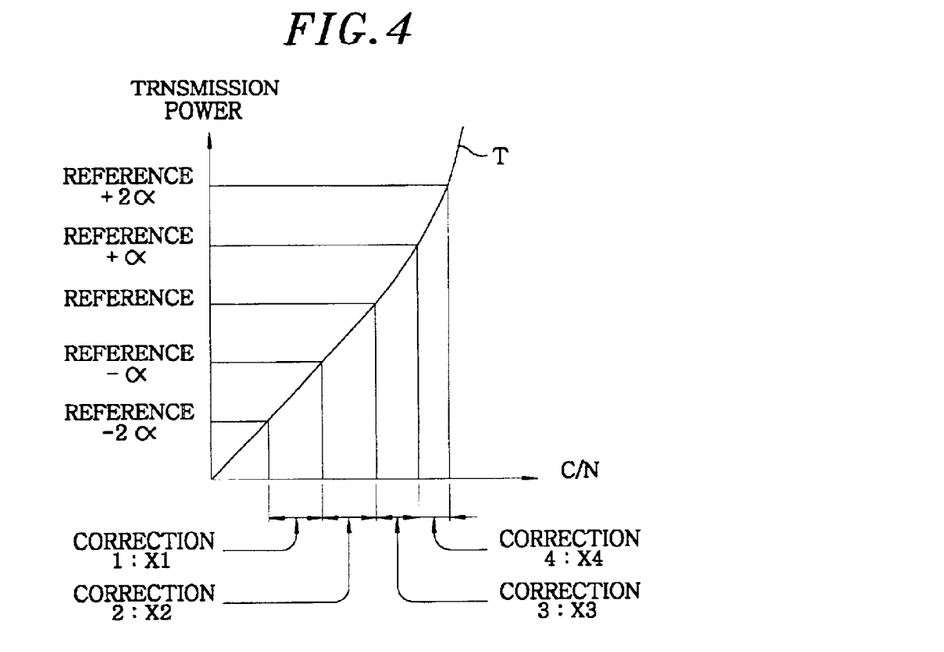
FIG. 4 depicts an exemplary correction scheme of a transmission channel condition as a function of transmission power.

Referring to FIG. 4, there is illustrated a method for correcting the transmission channel condition, e.g., a C/N value, based on the transmission power when the relationship between the transmission power and the transmission channel condition is nonlinear.

When the relationship between the transmission power and the transmission channel condition is linear, a controlled transmission power value can be used as a direct measure for the correction value of the transmission channel condition. In general, however, the relationship between the transmission power and the transmission channel condition is not linear since the evaluation result of transmission channel condition is saturated due to, e.g., the limitation of dynamic range of the input signal.

In this case, it is necessary to correct the transmission channel condition by using the combination of the transmission power values of the transceivers involved in communications. In such a case, the transceiver in accordance with the present invention stores in a memory the relationship between the combination of the transmission power values and the correction value of the transmission channel condition and corrects the transmission channel condition based on the stored data in the memory.

In FIG. 4, an exemplary relationship between the transmission power and the C/N value is illustrated as T. The relationship is nonlinear since the C/N value becomes saturated as the transmission power becomes larger. The horizontal and vertical axis in FIG. 4 represents the C/N value and the transmission power, respectively. It is assumed that the transmission power control value (Tx-POW) can change to one of 5 values (reference value −2α) [dB], (reference value −α) [dB], (reference value)[dB], (reference value +α) [dB], and (reference value +2α) [dB].

In FIG. 4, it is also assumed that the correction value 1 between C/N values corresponding to the transmission powers of (reference value −α) and (reference value −2α) respectively, is X1; the correction value 2 between C/N values corresponding to the transmission powers of (reference value) and (reference value −α), respectively, is X2; the correction value 3 between C/N values corresponding to the transmission powers of (reference value +α) and (reference value), respectively, is X3; and the correction value 4 between C/N values corresponding to the transmission powers of (reference value +2α) and (reference value +α), respectively, is X4.

For example, if the transmission powers of the radio stations A and B are (reference value +α) and (reference value), respectively, the correction value 3 (X3) can be used as a correction value for the transmission channel condition. That is, the radio station A can add +X3 to the evaluation result of the transmission channel condition obtained based on a signal received from the radio station B. On the contrary, the radio station B can add −X3 to the estimation result of the transmission channel condition obtained based on a signal received from the radio station A.

Further, if the transmission powers of the radio stations A and B are (reference value +2α) and (reference value −α), respectively, the correction value 2+ the correction value 3+ the correction value 4 (X2+X3+X4) can be used as a correction value for the transmission channel condition. That is, the radio station A can add +(X2 +X3+X4) to the evaluation result of the transmission channel condition obtained based on a signal received from the radio station B. On the contrary, the radio station B can add −(X2+X3+X4) to the estimation result of the transmission channel condition obtained based on a signal received from the radio station A.

The transceiver in accordance with the present invention has been described to determine the modulation method to be used in transmission by changing the M-ary modulation value that determines the number of bits per one symbol. However, the conversion of the modulation method in the transceiver can also be achieved by changing the transmission rate (the symbol rate) used in transmission based on the transmission channel condition.

As mentioned above, since the transceiver in accordance with the present invention determines the modulation method by considering the difference between the transmission powers of both the communicating transceivers in addition to the quality of the transmission channel in the digital wireless communications system, a more effective conversion of modulation method can be accomplished to improve the communications quality even in case where the communicating transceivers have different transmission powers.

Further, the transceiver in accordance with the present invention can be preferably applied to the wireless subscriber stations (the wireless fixed stations) 52, 62, 63 and 64 and the wireless base stations 51 and 61 of the FWA systems shown in FIGS. 9A and 9B.

In the transceiver in accordance with the present invention, the transmission channel evaluation circuit 4 evaluates a transmission channel condition based on a received signal and corrects the evaluated transmission channel condition based on the difference between the transmission powers. Further, the modulation level control circuit 5 determines a modulation method based on the corrected transmission channel condition.

Further, the frame in accordance with the present invention includes the transmission power information 13 representing transmission power of the counterpart transceiver.

The transceiver and the FWA system in accordance with the present invention can be configured in a manner different from those described above.

Further, the application area of the transceiver of the present invention is not limited to that describe above. For instance, the transceiver in accordance with the present invention can be applied to various communications devices such as a wireless base station, a wireless mobile station, a wireless fixed station or a wireless relay station.

The transceiver or the FWA system in accordance with the present invention can be configured to have hardware resources including a processor and a memory wherein the processor executes a control program stored in the memory (ROM) to control the transceiver. Further, the element of the transceiver can be configured as an independent hardware circuit.

The control program can be stored in a storage medium, such as a floppy disk or a CD-ROM, which can be readable by a computer. In this case, the control program is loaded to the memory from the storage media so that the control program can be executed by the processor.

While the invention has been shown and described with respect to the preferred embodiments, it will be understood by those skilled in the art that various changes and modifications may be made without departing from the spirit and scope of the invention as defined in the following claims.

What is claimed is:

1. A transceiver comprising:
   a transmission channel condition evaluator for evaluating a transmission channel condition based on a signal received from a transmitter-receiver; and
   a modulation method selector for determining a modulation method to be used in transmitting a signal to the transmitter-receiver based on the evaluated transmission channel condition and a difference between transmission power of the transceiver and that of the transmitter-receiver.

2. The transceiver of claim 1, wherein the modulation method selector determines the modulation method among a plurality of modulation methods that include QPSK (Quadrature Phase Shift Keying), 16QAM (Quadrature Amplitude Modulation) and 64QAM.

3. The transceiver of claim 1, wherein the modulation method selector determines the modulation method based on transmission power information included in the signal received from the transmitter-receiver, the transmission power information representing a transmission power of the transmitter-receiver.

4. The transceiver of claim 2, wherein the modulation method selector determines the modulation method based on transmission power information included in the signal received from the transmitter-receiver, the transmission power information representing transmission power of the transmitter-receiver.

5. An FWA (Fixed Wireless Access) system with a wireless base station and a plurality of wireless fixed stations, wherein each of the wireless fixed stations includes the transceiver according to claim 1 and said each of the wireless fixed stations communicates with the wireless base station by using the transceiver.

6. The FWA system of claim 5, wherein the modulation method selector determines the modulation method among a plurality of modulation methods that include QPSK (Quadrature Phase Shift Keying), 16QAM (Quadrature Amplitude Modulation) and 64QAM.

7. The FWA system of claim 5, wherein the modulation method selector determines the modulation method based on transmission power information included in the signal received from the transmitter-receiver, the transmission power information representing transmission power of the transmitter-receiver.

8. The FWA system of claim 6, wherein the modulation method selector determines the modulation method based on transmission power information included in the signal received from the transmitter-receiver, the transmission power information representing transmission power of the transmitter-receiver.

* * * * *